US009296406B2

(12) United States Patent
Presley

(10) Patent No.: US 9,296,406 B2
(45) Date of Patent: Mar. 29, 2016

(54) MATERIAL PANEL DOLLY AND WORKSTATION

(71) Applicant: Charles H. Presley, Headland, AL (US)

(72) Inventor: Charles H. Presley, Headland, AL (US)

( * ) Notice: Subject to any disclaimer, the term of this patent is extended or adjusted under 35 U.S.C. 154(b) by 0 days.

(21) Appl. No.: 14/507,146

(22) Filed: Oct. 6, 2014

(65) Prior Publication Data

US 2015/0130340 A1    May 14, 2015

Related U.S. Application Data

(60) Provisional application No. 61/901,695, filed on Nov. 8, 2013.

(51) Int. Cl.
*B62B 3/08* (2006.01)
*B62B 3/10* (2006.01)
*B62B 3/02* (2006.01)

(52) U.S. Cl.
CPC . *B62B 3/108* (2013.01); *B62B 3/02* (2013.01); *B62B 2205/006* (2013.01); *B62B 2205/104* (2013.01); *B62B 2206/06* (2013.01)

(58) Field of Classification Search
CPC .................................. B62B 3/10; B62B 3/108
See application file for complete search history.

(56) References Cited

U.S. PATENT DOCUMENTS

| | | | | |
|---|---|---|---|---|
| 2,815,132 | A | * | 12/1957 | Stone .............................. 414/11 |
| 3,047,305 | A | * | 7/1962 | Kleinschmidt ............... 280/651 |
| 3,288,479 | A | * | 11/1966 | Ullman .......................... 280/35 |
| 3,923,167 | A | * | 12/1975 | Blankenbeckler .............. 414/11 |
| 4,050,671 | A | * | 9/1977 | Coleman ....................... 254/7 R |
| 4,119,044 | A | * | 10/1978 | Hines .............................. 108/27 |
| 4,326,726 | A | * | 4/1982 | Dunchock .................... 280/79.3 |
| 4,478,429 | A | * | 10/1984 | Adams .......................... 280/655 |
| 4,488,733 | A | * | 12/1984 | Hellsten ..................... 280/47.16 |
| 4,630,838 | A | * | 12/1986 | Stockton .................... 280/47.17 |
| 4,679,805 | A | * | 7/1987 | Cunningham ........... 280/33.991 |
| 4,913,614 | A | * | 4/1990 | O'Rarden ..................... 414/343 |
| 5,037,117 | A | * | 8/1991 | Hershberger ................ 280/79.7 |
| 5,048,857 | A | * | 9/1991 | Stevens ......................... 280/651 |
| 5,072,960 | A | * | 12/1991 | Sperko ....................... 280/47.34 |
| 5,163,695 | A | * | 11/1992 | Pakowsky .................... 280/79.7 |
| 5,351,976 | A | * | 10/1994 | Penson ....................... 280/47.35 |
| 5,507,509 | A | * | 4/1996 | Della Polla, Jr. ............. 280/79.7 |
| 5,535,898 | A | * | 7/1996 | Burgess et al. ............... 211/206 |
| 6,264,220 | B1 | * | 7/2001 | Pierce et al. ................. 280/79.3 |
| 6,296,262 | B1 | * | 10/2001 | Skinner ........................ 280/79.7 |
| 6,422,581 | B1 | * | 7/2002 | Gebell et al. ............... 280/47.17 |
| 6,450,514 | B1 | * | 9/2002 | Ronca ........................ 280/79.11 |
| 6,579,051 | B2 | | 6/2003 | Echternacht |

(Continued)

*Primary Examiner* — Jeffrey J Restifo
*Assistant Examiner* — Erez Gurari
(74) *Attorney, Agent, or Firm* — Daniel Brian Boudwin

(57) ABSTRACT

Disclosed is a drywall sheet and large panel dolly. The device comprises a lower portion having two sets of lockable caster wheels pivotably attached thereto, and an upper portion adapted to support large drywall panels, plywood sheets, lumber, and other supplies thereon. The upper and lower portions form a frame having a low center of gravity to support oversized sheets without tipping. The upper portion includes an upstanding rail, a panel rest support with upstanding ledges to lock drywall panels in place, a handhold cutout for grasping the lower edge of panels, and an outer platform for supporting lumber and other items. The lower portion is a rectangular frame that is telescopically connected to the upper portion, wherein the upper portion is height adjustable with respect thereto. The lower portion provides members suitable for standing thereon and for positioning an optional drawer or tray thereto for loose supply storage.

6 Claims, 8 Drawing Sheets

(56) References Cited

U.S. PATENT DOCUMENTS

| | | | |
|---|---|---|---|
| 6,659,495 B1 * | 12/2003 | Sanderson | 280/651 |
| 6,786,503 B1 | 9/2004 | Young | |
| 7,048,258 B1 * | 5/2006 | Dromgool et al. | 254/332 |
| 7,055,834 B1 * | 6/2006 | White et al. | 280/47.35 |
| 8,109,526 B2 | 2/2012 | Mason | |
| 8,141,888 B1 * | 3/2012 | Levasa et al. | 280/79.7 |
| 2002/0113390 A1 * | 8/2002 | Hallman et al. | 280/79.7 |
| 2003/0030239 A1 * | 2/2003 | Woerner | 280/47.35 |
| 2005/0040618 A1 * | 2/2005 | Beatty | 280/79.3 |
| 2006/0232034 A1 * | 10/2006 | Skiles | 280/79.2 |
| 2007/0085287 A1 | 4/2007 | Wyse | |
| 2007/0216119 A1 * | 9/2007 | Cosgrove | 280/79.7 |
| 2007/0235968 A1 * | 10/2007 | Krizan et al. | 280/79.7 |
| 2008/0235871 A1 * | 10/2008 | York | 5/510 |
| 2009/0166999 A1 * | 7/2009 | Mason et al. | 280/651 |
| 2014/0015210 A1 * | 1/2014 | Pasek | 280/79.7 |

* cited by examiner

MATERIAL PANEL DOLLY AND WORKSTATION

CROSS REFERENCE TO RELATED APPLICATION

This application claims the benefit of U.S. Provisional Application No. 61/901,695 filed on Nov. 8, 2013. The above identified patent application is herein incorporated by reference in its entirety to provide continuity of disclosure.

BACKGROUND OF THE INVENTION

1. Field of the Invention

The present invention relates to dollies and carts for transporting construction material within a work site. More specifically, the present invention pertains to a new and novel drywall transport dolly and workstation, whereby a worker can readily move one or more sheets of drywall without lifting the same before hanging the drywall in an appropriate area. Furthermore, the device provides a means to raise drywall sheets to a more ergonomic cutting height prior to installation.

Drywall is a well-known construction product used to make interior walls and ceilings within buildings and homes. The material is a plaster material pressed between two sheets of paper material that form a continuous surface for finishing the interior of a room. The drywall is provided in large sheets that must be handled prior to installation, whereby the drywall is generally delivered in stacks to a construction site and workers manually lift and transport the individual boards to their destined installation location. A lift can be used to support ceiling and higher wall installations, however this is typically used when installing drywall manually and is only after the drywall sheet has been transported through the site to the installation location.

Drywall sheets are large and cumbersome to handle because of their size and dimensions. The sheets are also quite dense and therefore heavy for a single individual to handle. As a result, drywall installers spend a considerable amount of time lifting and toting these heavy sheets during the installation process, wherein carrying the sheets is usually best accomplished using two installers. Drywall installers already spend a significant amount of time bending down or kneeling during the installation process, therefore the increased burden of carrying large and bulky sheets by hand is not a welcome addition to the strain on the installer. As a result, drywall hangers and installers who do not take precautions to avoid lifting injuries or strains can be prone to sudden injury on the job, which is expensive and an unwanted risk for all involved. In addition to individual pain and discomfort, companies may deal with high insurance claims and a decreased workforce as a result of these types of injuries.

To mitigate these types of injuries and to improve efficiency when hanging drywall, particularly in larger buildings and residences, the present invention contemplates a mobile drywall dolly and workstation hat can support a plurality of drywall sheets at one time. The dolly can support several very large and otherwise very cumbersome drywall sheets or similar panels (e.g. plywood sheets, lumber, etc.), thereby allowing the installer to simply wheel the assembly and its payload to the installation location prior to installation. The present invention comprises a dolly with a low center of gravity and a low profile, wherein the upper portion of the assembly is designed to hold one or more large drywall sheets at a slight angle without the dolly tipping over. The dolly includes lockable caster wheels, a storage location below the sheet carrier upper and optional trays for supporting tools and supplies. The device further provides a means of adjusting its height, provides handhold locations when lifting the sheets from the dolly, and finally provides a foot pedestal location for the user to stand on the dolly during installation activities. The device furthermore provides a low, U-shaped resting bar to allow for easy pass over of drywall sheets, while using the same to support the sheets. Overall, the present invention is both a transport dolly and a drywall workstation, eliminating the need for an installer to carry sheets of drywall prior to installation and carting installation tools in conjunction therewith. The device may further serve as a general dolly for transporting and supporting construction materials, lumber, and other materials thereon.

2. Description of the Prior Art

Devices have been disclosed in the prior art that relate to dollies and carrying carts. These include devices that have been patented and published in patent application publications. These devices generally relate to carts of varying construction and for various purposes, including supporting construction supplies such as plywood, drywall, and other sheets of material. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 6,786,503 to Young, which discloses a panel carrying cart having an elongated and extendable frame adapted to support large sheets of material and provide a pivotable frame that can accommodate floor surface irregularities. The frame comprises a pair of elongated longitudinal rods having a hinge joint therealong. Lateral rods attach across the longitudinal rods, which support cart wheels at the ends thereof. The ends of both the lateral rods and the longitudinal rods further comprise upright members for supporting sheet material within the frame interior. Overall, the Young device is suited for carrying oversized sheets of material using a pivoting frame that can accommodate floor irregularities. The Young device however, utilizes upright members to support sheets of material, which can dig into the surface thereof. Furthermore, no means of supporting the lower edge of the sheets is provided on the frame to stabilize the material sheets in a substantially upright condition. The present invention contemplates a small dolly that comprises a low center of gravity and a weighted lower portion such that its size relative to its drywall payload can remain as small as possible. The upper portion of the present invention is suited for supporting drywall sheets at a substantially upright orientation while stabilizing the lower edges thereof.

Similar to the Young device is U.S. Pat. No. 6,450,514 to Ronca, which discloses a dolly for transporting large rectangular and circular sheets of material. The device comprises a base having four caster wheels and an upward extending stanchion that is adapted to be a support upon which to rest the sheet material. The base includes an open frame design with an open interior to accept there lower portion of the sheet material therethrough, while a retention bar on the base prevents the sheets from sliding once positioned on the device. While providing a dolly means that supports sheets in a substantially upright configuration, the Ronca device limits the side in which the sheets can be stacked on the device, and further comprises a stanchion that supports the sheets high along their outer surface. The present invention is a low profile frame having an upstanding support bar that is only just above a pair of drywall perches on the frame of the device. The present invention allows the user to control the height of the perch, while the upstanding support bar does not extend far above the perch while in operation, thereby allowing supported articles to be easily passed over the support bar and loaded from either side of the device. The design of the present invention diverges significantly from that of Ronca.

U.S. Patent Publication No. 2007/0085287 to Wyse discloses a drywall cart that includes a frame with caster wheels and a central trough for supporting the drywall therein. The device further includes uprights that extend upwards from the frame at a slight angle to support the drywall along their outer surfaces, wherein the drywall is disposed in the Wyse cart in a substantially upright condition. While disclosing a means of supporting drywall, the Wyse device provides a pair of uprights along both sides of the device and positions the drywall along the interior of the frame, thereby making it difficult to load and unload the drywall into the cart. A user must remove the uprights on one side to access the drywall, or load/unload from the ends of the cart. The present invention provides a height adjustable upper portion the positions the lower edge of the drywall higher above the ground, whereby a handhold cutout allows the installer to grip the lower edge of the drywall without bending over completely. Access is further provided to the installer from the sides of the present dolly, whereby the drywall is positioned at a slight inward angle, wherein its lower edge is outward of its upper edge. This facilitates ease of loading and unloading not contemplated by the Wyse device. The structure of the present invention diverges significantly form the Wyse device, wherein the elements of the present invention facilitate more rapid transfer of drywall sheets and reduced load on the installer. The present invention accomplishes this while maintaining a low center of gravity to prevent tipping when supporting oversized drywall panels.

U.S. Pat. No. 6,579,051 to Echternacht discloses a carriage for support and installation of doors and panels, whereby a wheeled chassis supports a door holding frame that is pivotable with respect to the chassis. The articulating frame supports a panel in either a horizontal or substantially vertical state, assisting an installer when hanging doors and other panels. The Echternacht contemplates an articulating mechanism that lifts panels into position from a resting state, wherein the mechanism attaches to the frame and connects the frame to the wheeled chassis. While providing an installation tool, the Echternacht device is adapted for different purposes and includes a higher degree of complexity than is desired by the present invention. The present invention contemplates a wheeled dolly that assists a worker moving and installing panels, such as drywall and plywood, wherein the device is a dolly with a substantially static frame having height adjustment only.

Finally, U.S. Pat. No. 8,109,526 to Mason discloses a cart that includes a first and second upright pillar that is mounted to a lower wheeled platform. The upright pillars support movable platforms using pivotable hanger elements disposed in the upper portion of each pillar whereby the hangers support work platforms or go unused to provide clearance on the platform and between the pillars. The Mason device provides a highly modular and reconfigurable cart that provides different loading surfaces and support surface options. However, the Mason device is not designed to support large panels in an elevated position as provided by the dolly of the present invention. The present invention supports drywall panels and the like, whereby the lower edge thereof is supported by an upper frame portion above a lower wheeled portion. The upper frame portion is height adjustable with respect to the lower portion, whereby the lower edge of the drywall panel can be accessed without bending over completely. While the present invention is modular, its primary aspect is supporting large panels in a substantially upright state, whereby the lower edge thereof is accessible and elevated, and the user can readily load and unload the panels thereonto without the assembly tipping during use.

Upon review of the relevant prior art, it is submitted that the present invention is substantially divergent in design elements from the prior art, and consequently it is clear that there is a need in the art for an improvement to existing drywall and large panel transport devices. In this regard the instant invention substantially fulfills these needs and resolves drawbacks in the art.

SUMMARY OF THE INVENTION

In view of the foregoing disadvantages inherent in the known types of large panel carts and supports now present in the prior art, the present invention provides a new drywall and construction panel dolly, wherein the same can be utilized for providing convenience for the user when transporting, lifting, and installing drywall and other construction panels in a worksite.

It is therefore an object of the present invention to provide a new and improved construction panel dolly that has all of the advantages of the prior art and none of the disadvantages.

It is another object of the present invention to provide a construction panel dolly that is specifically suited for supporting, transporting and installing drywall panels, wallboard, plywood, lumber, and other panels in a construction environment.

Another object of the present invention is to provide a construction panel dolly that includes low center of gravity such that the device can support elongated and enlarged panels, while supporting the same at an elevated position without tipping over under the weight thereof.

Yet another object of the present invention is to provide a construction panel dolly that includes pivoting and locking caster wheels to allow for ready transport of materials on the device.

Another object of the present invention is to provide a construction panel dolly that facilitates lifting of large panels without requiring the user to completely bend over to engage the lower edge thereof.

Another object of the present invention is to provide a construction panel dolly that supports panels in a substantially upright condition using an inner support surface and an upstanding rail, whereby the user can engage in cutting activities while a panel is being supported by the dolly and rest panels against the upstanding rail for boards to be supported and easily passed thereover without straining.

Another object of the present invention is to provide a construction panel dolly that includes an outer platform for supporting elongated lumber and other supplies while simultaneously supporting construction panels.

Still yet another object of the present invention is to provide a construction panel dolly that comprises an optional lower drawer or tray for supporting loose fasteners and equipment.

Another object of the present invention is to provide a construction panel dolly that includes a sturdy frame that can serve as a step ladder when the wheels are locked.

A final object of the present invention is to provide a construction panel dolly that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
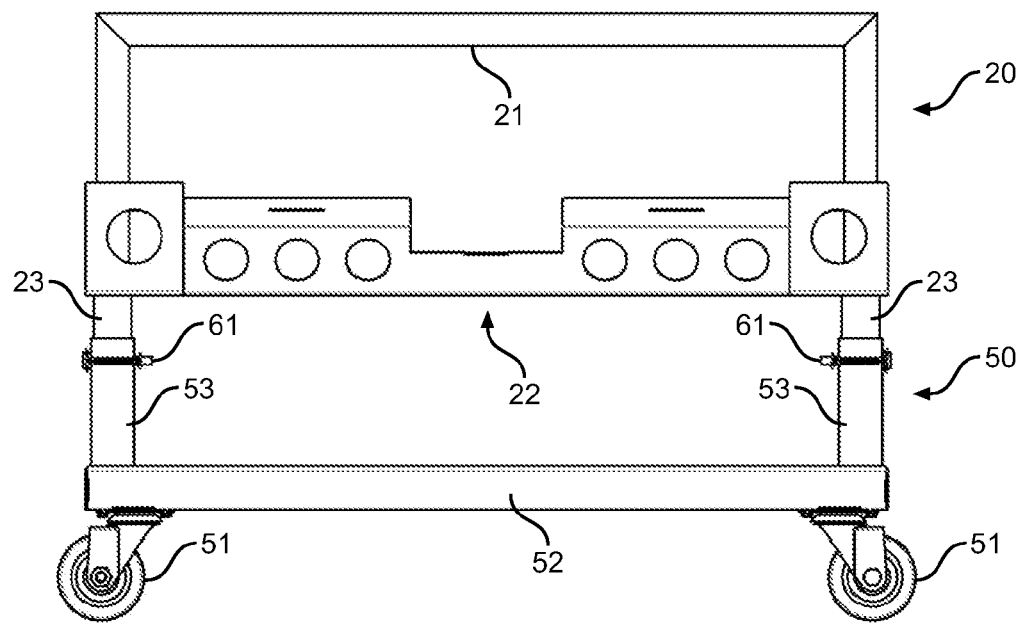
FIG. 1 shows a side view of the construction panel dolly of the present invention.

Reference is made herein to the attached drawings. Like reference numerals are used throughout the drawings to depict like or similar elements of the construction panel dolly of the present invention. For the purposes of presenting a brief and clear description of the present invention, the preferred embodiment will be discussed as used for supporting drywall panels and assisting transport and installation thereof. The figures are intended for representative purposes only and should not be considered to be limiting in any respect.

Figure 2:
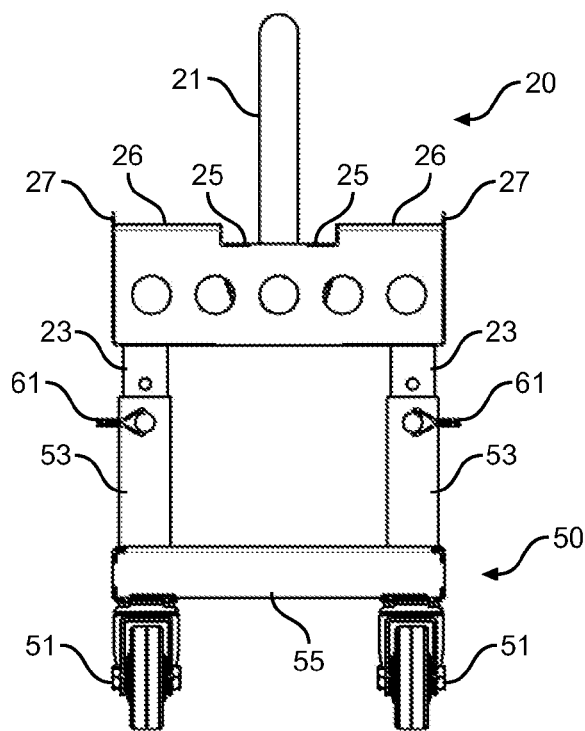
FIG. 2 shows an end view of the construction panel dolly of the present invention.

Referring now to FIGS. 1 and 2, there is shown a side view and an end view of the construction panel dolly of the present invention. The dolly is a cart, workstation, and workplace assistant that is adapted to assist construction workers and drywall hangers install panel material in a work environment. The primary use contemplated by the dolly is supporting and transporting drywall just prior to installation. The dolly comprises a lower portion 50 and an upper portion 20. The lower portion 50 comprises a first and second end member 55 and a first and second lengthwise member 52 that form a substantially rectangular frame. Adjacent to the corners of the rectangular frame are rotatably attached caster wheels 51. The wheels 51 allow the dolly to roll and pivot as required while supporting drywall panels, while during installation and loading the wheels 51 can be locked in place to prevent the dolly from moving.

Extending upwards from the corners of the lower frame are upstanding support sleeves 53, which are adapted to receive complimentary downward members 23 from the upper portion 20. The downward members 23 are received by the upstanding sleeves 53 in a telescopic relationship, whereby the upper portion 20 can be adjusted relative to the lower portion 50 and locked into a static configuration using locking pins 61 at each telescoping joint. This allows the installer to set the height of the upper portion 20 with respect to the ground, and therefore set the height at which drywall panels and other construction panels are supported by the dolly. The downward members 23 include a plurality of apertures that align with apertures in the upstanding sleeves 53, whereby the locking pins 61 secure through aligned apertures to lock each telescoping joint into a static condition.

The upper portion 20 of the dolly is a structure adapted to support panels of material (e.g. drywall, plywood, etc.) in a substantially upright state. The upper portion comprises an upstanding rail 21 having a horizontal portion and two vertical portions at its ends to form an inverted U-shape that projects upwards from the dolly. The rail 21 is used to support the drywall panels along their backside surface while the lower edge of the drywall is positioned on a flat inner support surface 25 and retained by an inner upstanding lip. Above the inner support surface 25 is an outer platform 26, which is adapted to support lumber and other elongated material adjacent to the inner support surface 25. The outer edge of the outer platform 26 also comprises an outer upstanding lip 27 to retain material placed on the platform 26. In this way, the inner support surfaces 25 form an inner track to support material, while the outer platforms 26 form outer tracks to support other material.

Figure 3:
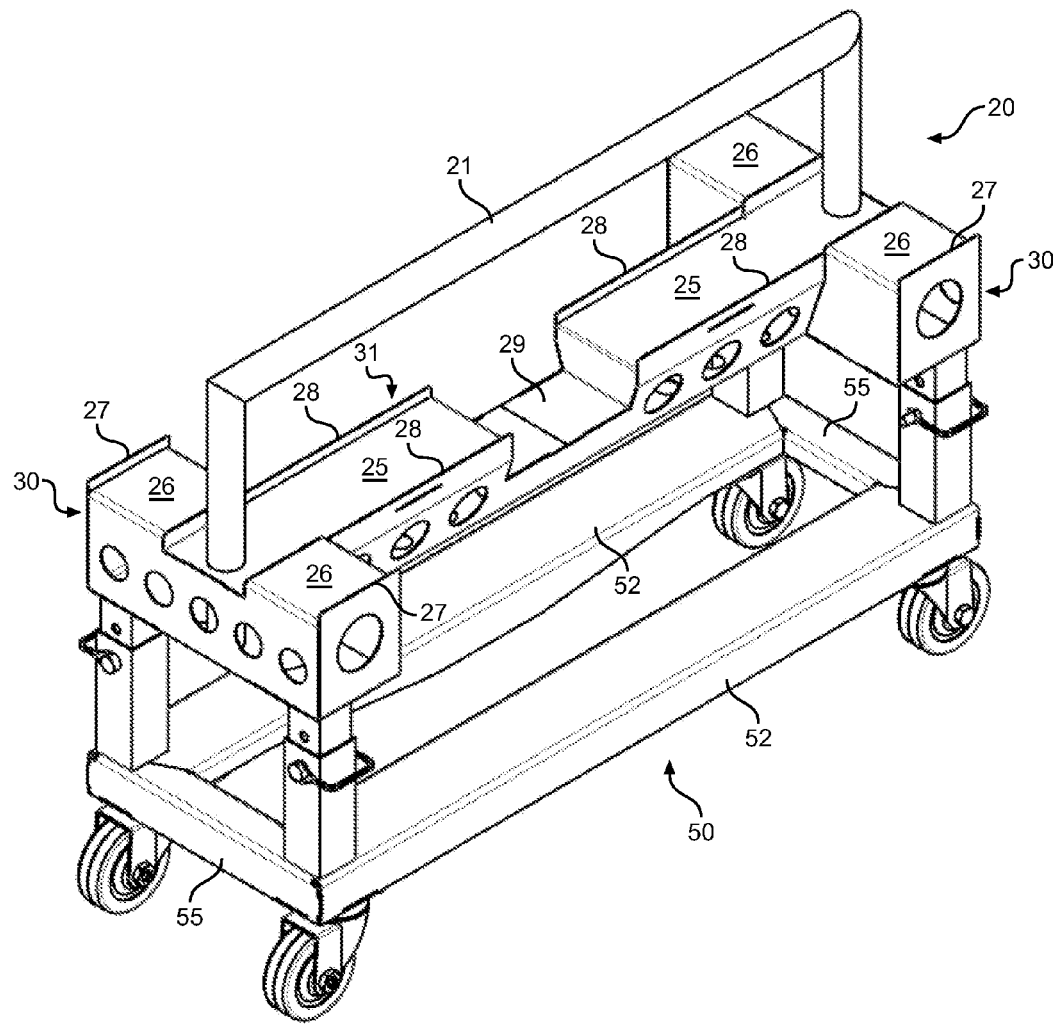
FIG. 3 shows an overhead perspective view of the construction panel dolly of the present invention.
Figure 5:
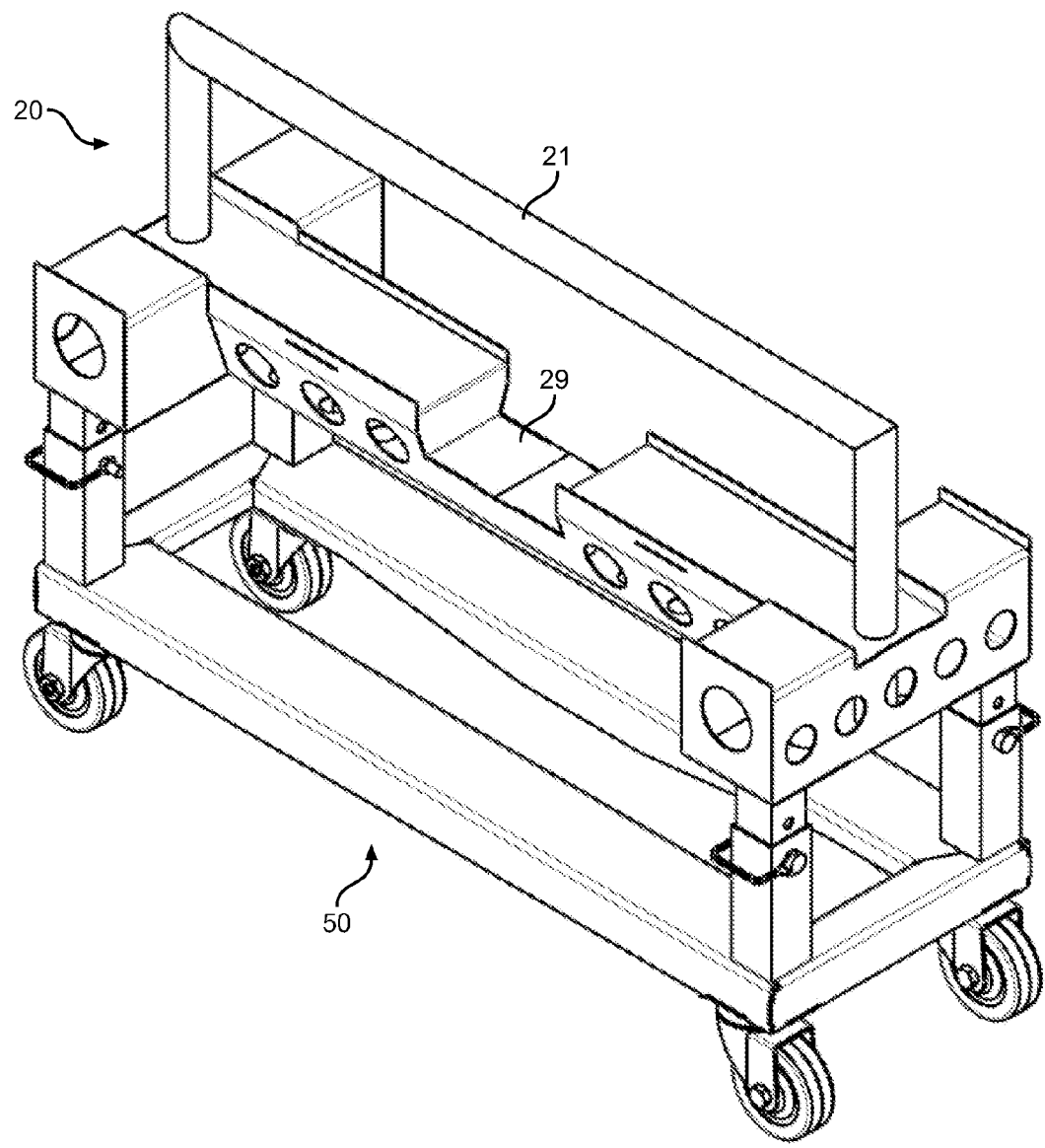
FIG. 5 shows another overhead perspective view.

Referring now to FIGS. 3 and 5, there are shown a first and second overhead perspective view of the dolly. In use, drywall panels are placed onto the upper portion 20 of the dolly, whereby the lower edge of the panel is placed onto the inner support surface 25 thereof and abutted against the inner upstanding lip 28. The inner upstanding lip 28 prevents the lower edge of the drywall from sliding outward, while the upstanding rail 21 supports the panel in an upright state. Outboard from the inner support surfaces 25 are outer platforms 26 that are adapted to support drywall panels thereon or support elongated lumber across the length of the dolly. The outer platforms 26 are support surfaces, whereby the outer edge thereof also includes an outer upstanding lip 27. Similar to the inner upstanding lip 28, the outer upstanding lip 27 retains the lower edge of items placed across the outer platforms 26 and prevents them from sliding off the edges of the dolly upper portion. Furthermore, the surface of the outer platforms 26 may be coated in an abrasive or high friction material to prevent slippage of drywall placed thereon.

The upper portion 20 has an I-shaped structure, comprising end portions 30 and a central portion 31 therebetween. The end portions 30 extend along the ends of the dolly and support the outer platforms 26, the ends of the inner support surfaces 25, the connection of the upper rail 21 to the upper portion, and finally the connection between the upper portion 20 and the downward members that engage the lower portion 50. Along the central portion 31 the inner support surface extends along both sides of the upstanding rail 21, which is centrally located on the dolly and along the central portion 31. This allows drywall panels to be supported from either side of the dolly during operation. Finally, along the middle of the central portion 31 is a handhold cut-out 29, which is a volume of removed material that extends downward from the inner support surfaces 25 such that a user can place his or her hands underneath the lower edge of a supported drywall panel being supported by the inner support surfaces 25. This assists with grasping and maintaining purchase of the lower edge of the drywall panel.

Figure 4:
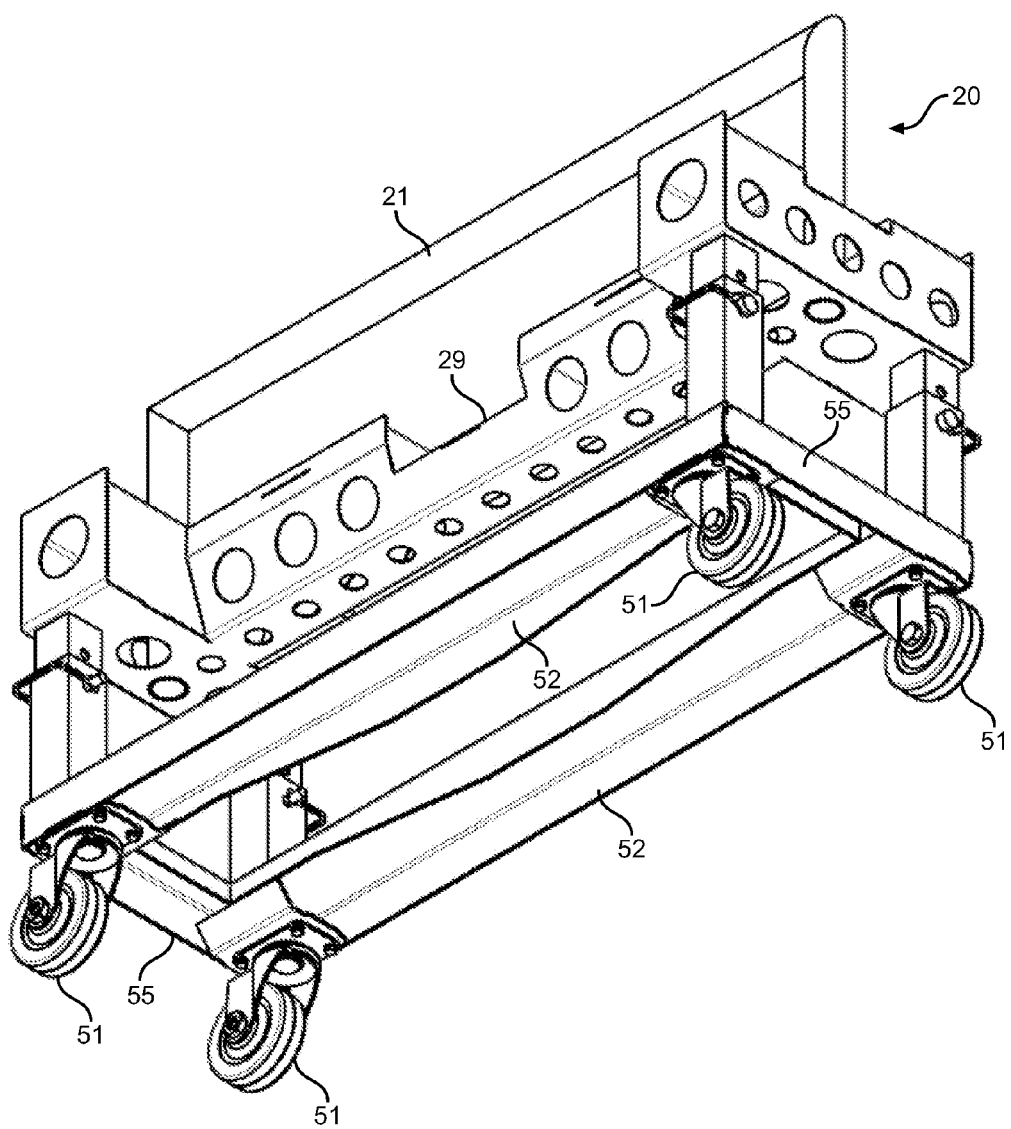
FIG. 4 shows an underside perspective view of the construction panel dolly of the present invention.
Figure 6:
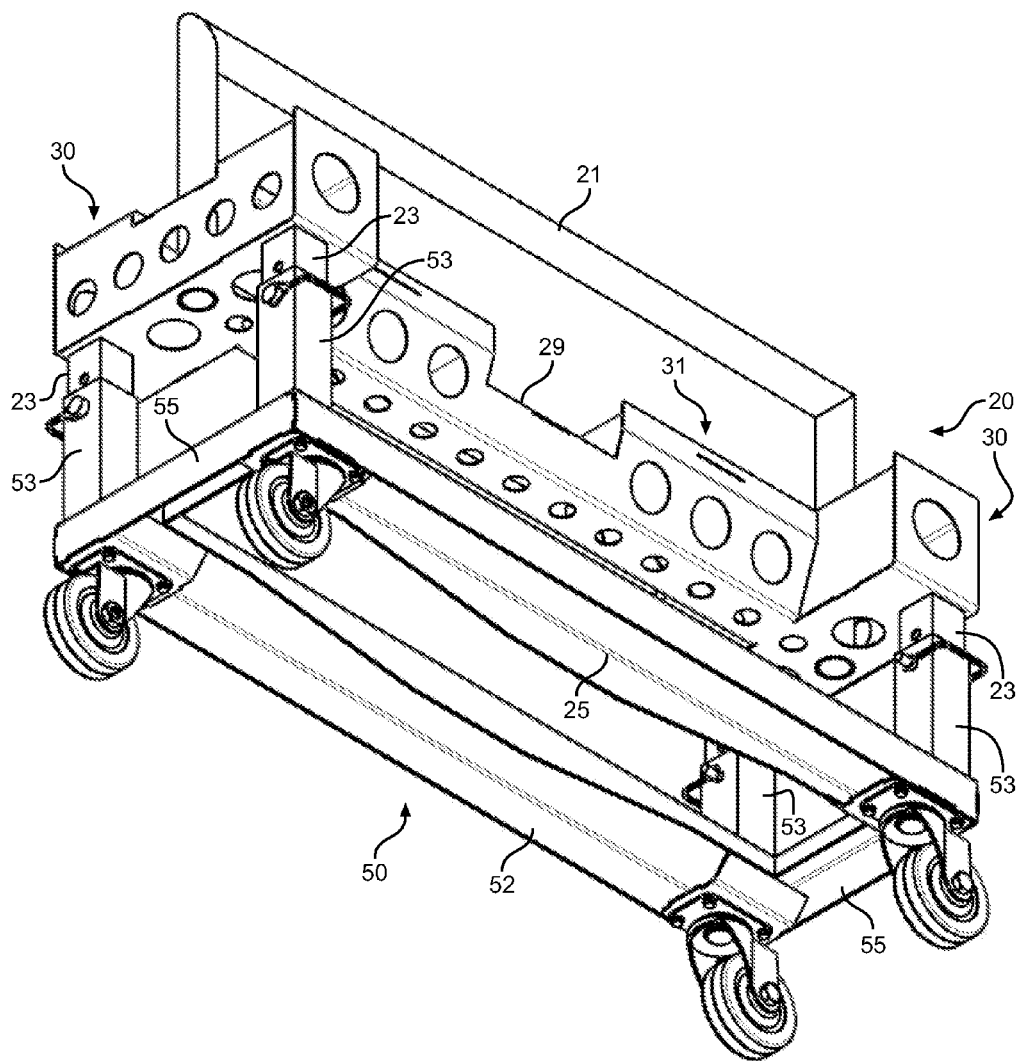
FIG. 6 shows another underside perspective view.

Referring now to FIGS. 3, 4 and 6, the lower portion of the dolly is highlighted. The lower portion 50 of the dolly is a substantially rectangular frame comprised of elongated lengthwise members 52 joined at their ends by a first and second end member 55. These members support the caster wheels 51 and are designed to maintain the stability of the dolly when large panels are positioned on the upper portion 20. The members are designed such that the lower portion 50 has a low center of gravity to resist tipping, while the caster wheels 51 are separated by a distance to further resist this tendency. The lower members are also designed to provide the user with a location to step onto, thereby providing a perch or platform to elevate the user when working in higher spaces. Finally, the lower members optionally support drawers or cabinets for storing loose articles and hardware.

Figure 7:
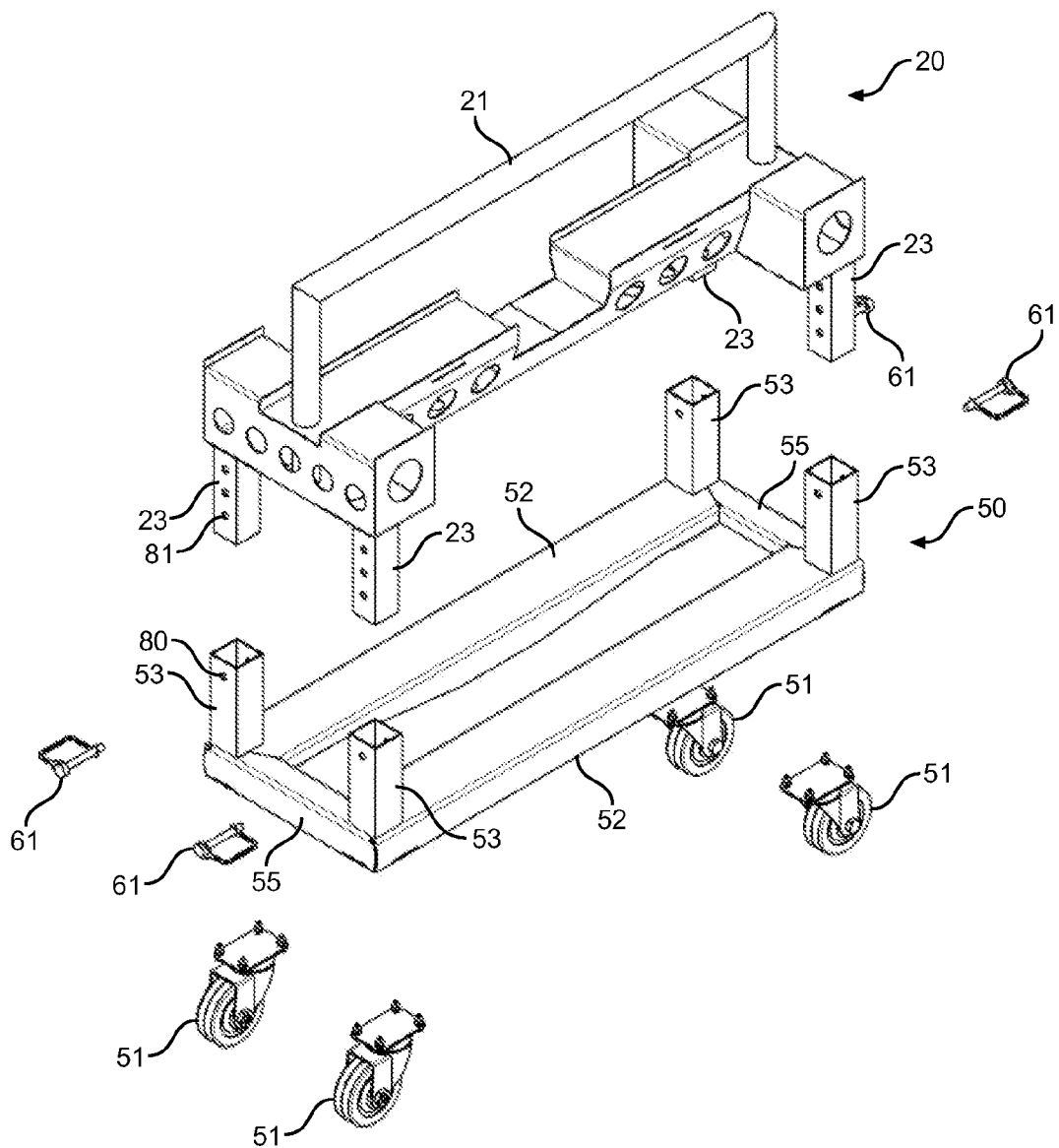
FIG. 7 shows an exploded perspective view of the construction panel dolly of the present invention.
Figure 8:
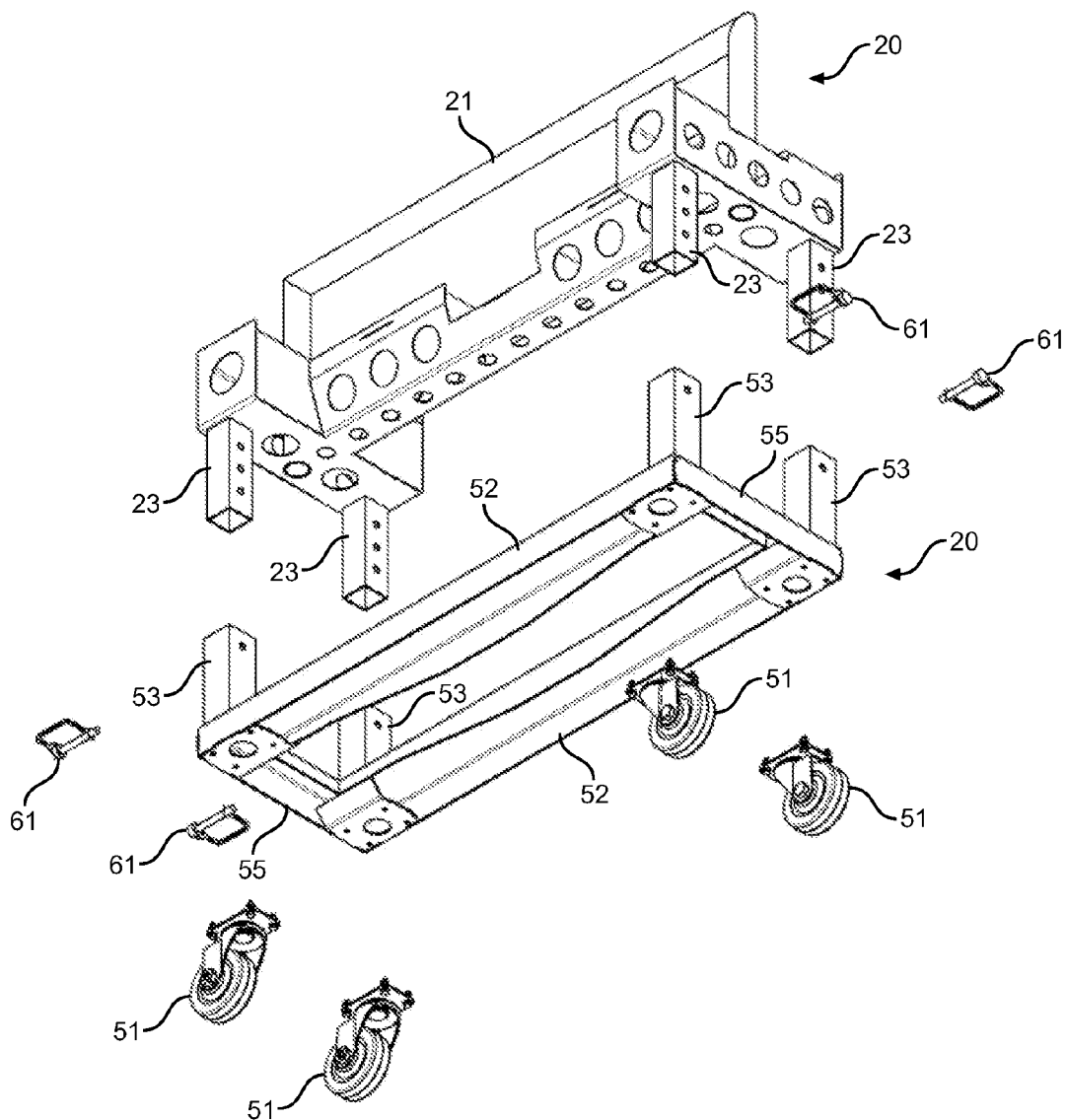
FIG. 8 shows another exploded perspective view.

Referring now to FIGS. 7 and 8, there are shown two exploded views of the present invention. As shown, the upper portion 20 of the device is in a sliding, telescopic relationship with regard to the lower portion 50, whereby the downward members 23 of the upper portion engage the upstanding sleeves 53 of the lower portion. The lockable wheels 51 are fastened to the lower surface of the lower portion 50, while locking pins 61 secure the upper and lower portions together in a static condition. Aligned apertures 80, 81 accept the locking pins 61 therethrough to secure the downward members 23 to the upstanding sleeves 53, while the user raises and lowers the upper portion via the upper rail 21.

Figure 9:
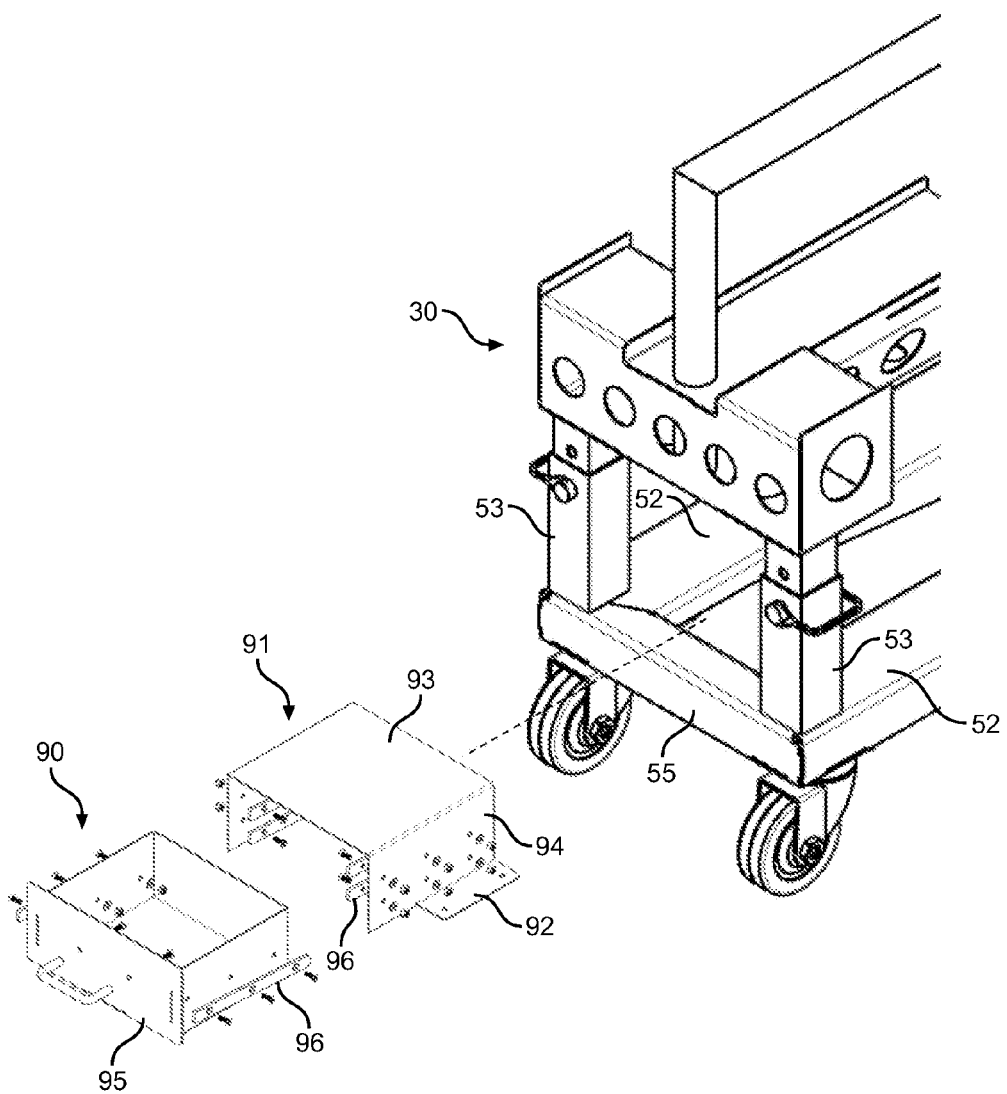
FIG. 9 shows a view of the optional lower portion drawers for storage of loose supplies.

Referring finally to FIG. 9, there is shown an exploded view of the optional drawers 90 of the present invention, which are adapted to be supported by the lower portion of the dolly and along one end. The drawers 90 preferably comprise a slidable drawer member having a front face 95, upstanding sidewalls, and a lower surface. The drawer 90 attaches via drawer sliders 96 to a housing 91 that supports the drawer. The housing 91 includes upstanding sidewalls 94 and an upper surface 93 to enclose the drawer 90 when disposed therein. The housing attaches to the lengthwise members 52 of the dolly lower portion via attachment flanges 92 extending outwards from the housing sidewalls 94. It is contemplated that different drawer and compartment designs may be employed, whereby a slidable drawer or open compartment is provided along the lower portion of the dolly for general storage. The design shown in FIG. 9 positions the drawer between the upstanding sleeves 53 of the lower portion, whereby the drawer front face 95 is positioned towards the end of the dolly.

Overall, the present invention provides a support for drywall and other construction panels or boards. When supporting drywall, the device serves as a transport device, as well as a support prior to lifting the drywall onto a complimentary tool (e.g. benches, panel lifts, etc.). In this way the device works well with existing drywall installation tools and allows the installer to more rapidly move drywall from one location to another in a jobsite. This reduces strain on the installer and potential for injuries. Furthermore, the present invention can be used as a workstation, whereupon drywall panels being supported by the dolly can be cut while thereon. Measured cuts can be taken while the lower edge of the drywall is supported by the device, and the upstanding rail can be used as a breaker bar or backstop upon which to fold drywall after cutting the inner and outer surfaces thereof.

In operation, the device is stable and resists tipping. Its low center of gravity has been demonstrated as capable of supported 400+ pounds of drywall without tipping, while the lower portion is capable of supporting an installer when a step lift is required. During loading and unloading activities, the wheels are locked into position to prevent the dolly from moving, while after loading the user guides the drywall and the dolly by pushing the sides or upper edge of the drywall to direct the motion of the assembly. At the end of the day, the dolly can be used to gather scraps during cleanup.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A material panel dolly, comprising:
   a lower portion and an upper portion;
   said lower portion comprising a substantially rectangular frame and having caster wheels attached thereto;
   said upper portion disposed above said lower portion and comprising an upstanding rail extending therefrom;
   said upstanding rail having a substantially inverted U-shape comprising a horizontal portion and two vertical portions;
   said upper portion further comprising a centrally located inner support surface, said upstanding rail extending above said inner support surface;
   said inner support surface having outer edges;
   said outer edges forming an upstanding lip;
   said outer edges of said inner support surface being offset from said upstanding rail whereby said upstanding lip of said outer edges is adapted to support a lower edge of a material panel while said upstanding rail supports a side of said material panel leaned thereagainst;
   said upper portion further comprising at least one outer platform between said upstanding lip and an outer upstanding lip;
   a handhold cut-out disposed within said inner support surface.

2. The material panel dolly of claim 1, wherein said outer platform further comprises a high friction surface preventing slippage along said surface of articles placed thereon.

3. The material panel dolly of claim 1, wherein:
   said upper portion further comprises an I-shaped frame having a central portion and end portions;
   said inner support surface disposed along said central portion;
   said end portions comprising a first and second outer platform with said inner support surface therebetween.

4. The material panel dolly of claim 1, wherein:
   said lower portion further comprises upstanding support sleeves having a hollow interior;
   said upper portion further comprises downward members adapted to be received into said hollow interior of said upstanding support sleeves;
   said upstanding support sleeves and said downward members forming telescoping joints adapted to be locked into a static configuration via locking pins, whereby said upper portion can be operably elevated above said lower portion.

5. The material panel dolly of claim 1, wherein said substantially rectangular frame of said lower portion further comprises a pair of lengthwise members and a first and second end member.

6. The material panel dolly of claim 1, further comprising at least one slidable drawer along said lower portion.

* * * * *